INVENTORS
ELI L. GARELICK
WILLIAM J. BERK
BY
ATTORNEY

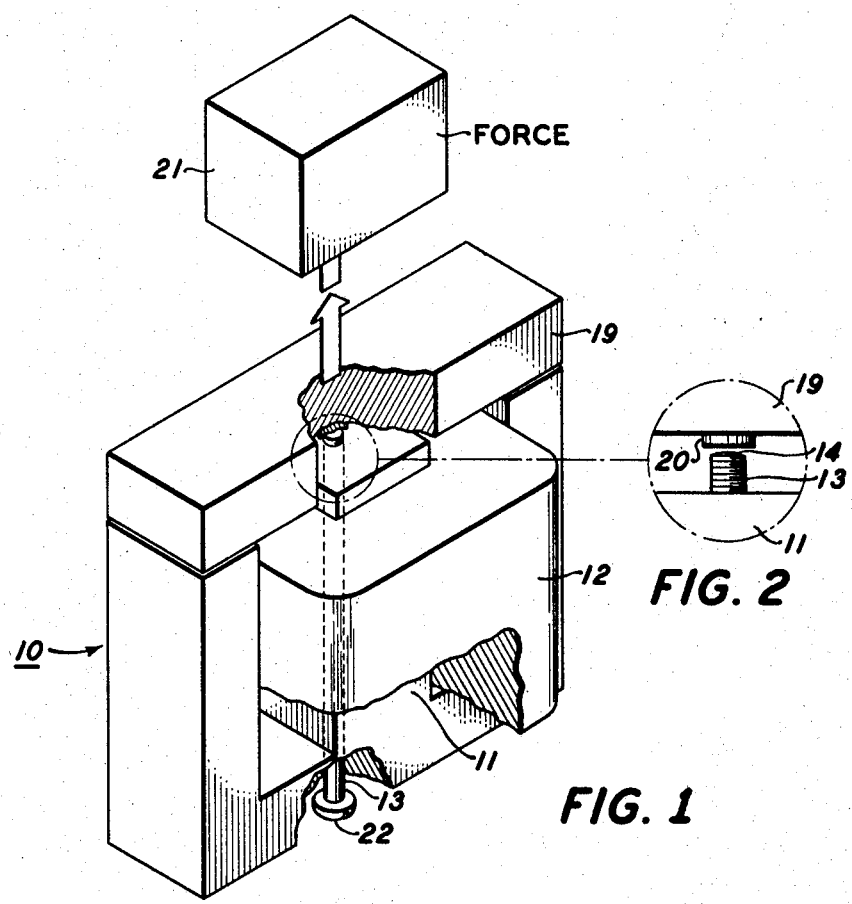
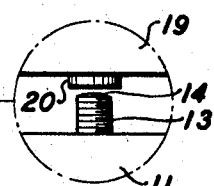
FIG. 2
FIG. 1
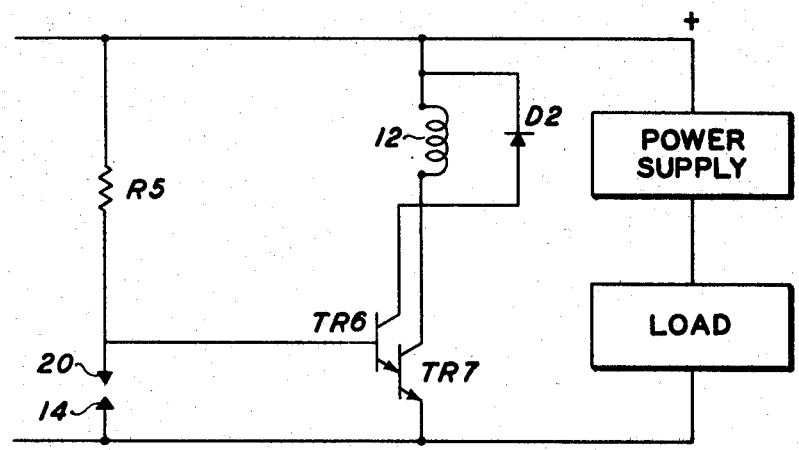
FIG. 3
INVENTORS
ELI L. GARELICK
WILLIAM J. BERK
BY
ATTORNEY Oct. 20, 1970  E. L. GARELICK ET AL  3,535,705
ELECTRONIC FORCE BALANCE DEVICE AND SYSTEMS UTILIZING SAME
Original Filed Jan. 21, 1965  9 Sheets-Sheet 2

Oct. 20, 1970  E. L. GARELICK ET AL  3,535,705
ELECTRONIC FORCE BALANCE DEVICE AND SYSTEMS UTILIZING SAME
Original Filed Jan. 21, 1965  9 Sheets-Sheet 5

INVENTORS
ELI L. GARELICK
WILLIAM J. BERK
BY
Daniel Rubin
ATTORNEY

Oct. 20, 1970  E. L. GARELICK ET AL  3,535,705
ELECTRONIC FORCE BALANCE DEVICE AND SYSTEMS UTILIZING SAME
Original Filed Jan. 21, 1965  9 Sheets-Sheet 7

INVENTORS
ELI L. GARELICK
WILLIAM J. BERK
BY
ATTORNEY

United States Patent Office 3,535,705
Patented Oct. 20, 1970

3,535,705
ELECTRONIC FORCE BALANCE DEVICE AND
SYSTEMS UTILIZING SAME
Eli L. Garelick, Henrietta, and William J. Berk, Rochester, N.Y., assignors to Transmation Inc., Rochester, N.Y., a corporation of Ohio
Continuation of application Ser. No. 427,011, Jan. 21, 1965. This application Apr. 9, 1969, Ser. No. 817,252
Int. Cl. G08c 19/02
U.S. Cl. 340—187  11 Claims

ABSTRACT OF THE DISCLOSURE

The disclosure relates to a force balance device wherein the detector and the force power balancer, which have unitary structure are operative without extraneous linkages. This is made possible by the high force ability of the power balancer and permits close coupling of the primary sensor to minimize the need for mechanical force amplification media. The measurement force directly actuates the motion detector to initiate on-off pulse excitation of the high force balancer so as to maintain a calibrated position datum. The pulse modulated feedback balancing force affords a cyclical operation of the primary sensor assembly and reduces mechanical hysteresis.

---

This application is a continuation of application Ser. No. 427,011 filed Jan. 21, 1965, now abandoned.

This invention relates to instrumentation and specifically, to a transmitting force-balancing unit emitting a utilizable power feedback to force-balance an input force signal produced mechanically, pneumatically, electrically, hydraulically, or the like. The device is primarily employed with sensors such as pressure bourdon springs, pressure capsules, temperature spring type systems, differential pressure capsules, differential pressure bellows, etc. for developing accurate electrical current output signals proportional to the input force.

There are marketed today various forms of electronic transmitters and associated devices which are generally regarded as either of the motion type device or alternatively, force-balance type device in which an input measurement force is opposed by an equal and opposite control force. The particular construction of these units as commercially marketed varies with the manufacturer. One common form of pressure transmitter and force balance differential pressure transmitter utilizes a magnetic linear variable differential transformer type detector with a voice coil feedback. Another manufacturer markets a pressure transmitter of a flux balance type that balances a magnetic flux and a force balance differential pressure transmitter utilizing a vane detector in a magnetic field with a voice coil feedback arrangement. Still another manufacturer produces a force-balance pressure transmitter utilizing an inductance change type air-gap detector with an oscillator, which acts as a variable resistor, while the output current acts on a magnetic unit to produce a force balance effect.

While each of these foregoing type transmitting devices, generally typifying the industry, have enjoyed varying degrees of commercial success and are widely used, they are generally characterized by inherent limitations imposed on their accuracy, ultimate utility, and power. Accuracy has been limited by such items as hysteresis effects, linkages and extreme sensitivity in the power supply causing unwanted fluctuation and variation. Size, low operating power, fragility, vibration, sensitivity and the like have been too closely dependent on the voice coil structure which is relatively bulky, inefficient, low power and subject to demagnetization. Additionally, these prior art devices have been regarded as excessively complicated being difficult and expensive to manufacture while having generally poor load current characteristics requiring careful load matching and being operative as transmitters only with their own recorder controller systems.

Now in accordance with the instant invention, there has been discovered a novel, highly sensitive and high force power device which in response to an input force operates a signal emitting means which substantially overcomes all the handicaps of the prior art type devices. At the same time, the device is characterized by having vastly increased flexibility and versatility for adaptation in various transmitting systems as will be described below.

A unique basic feature of the invention is the unitary structure of the detector and the force power balancer which are operative without extraneous linkages as required in prior art assemblies. This feature is made possible by the high force ability of the power balancer and permits close coupling of the primary sensor so as to minimize the need for mechanical force amplification media. The measurement force directly actuates the motion detector to initiate on-off pulse excitation of the high force balancer so as to maintain a calibrated position datum. The pulse modulated feedback balancing force affords a cyclical operation of the primary sensor assembly and reduces mechanical hysteresis. The cardinal resultant of all these features is higher accuracy output signals.

The apparatus enjoys relative structural simplicity while having highly sensitive detection and a feedback assembly which provides a high power feedback with a small size feedback structure. When utilized, for example, as a pulse type (high frequency) combinatiton detector and feedback, if effects elimination of hysteresis and permits the transmitter to be used as a frequency transmission device as well as a current transmission device. The unit exhibits a high level of repeatability and a high degree of linearity of input vs. output, whereby the proportional output (current) renders it useful with high accuracy for any feasible type current signal system now marketed. The unit is characterized by a low power consumption and a very low sensitivity to power supply voltage changes as compared to prior art devices. At the same time, it is generally insensitive to external magnetic effects. Since the apparatus hereof is characterized by extreme simplicity, if affords wide flexibility to its adaptations which include by way of example a pressure transmitter, flow transmiter, temperature transmitter, current isolator, signal level converter, pressure to current transducer, current adder, current subtractor, current ratio relay, computing relay, frequency transmitter, mass flow transmitter, electronic micrometer, thickness gauge, draft gauge, square root conversion transmitter, servorecorder, servo-signalling system, weight to current transducer, current/pressure ratio transducer, or the like as will be more fully described below.

Accordingly, it is an object of the invention to provide a novel force balance instrument transmitter having greater system sensitivity and characterized by wider high force power feedback versatility than heretofore. This and other objects as well as the various features, advantages and limitations of the invention will become apparent from the following description and drawings, in which:

FIG. 1 isometrically and schematically illustrates the pulse power balancing unit as employed herein having a first embodiment detector unit;

FIG. 2 is an enlarged view of a resistance-change detector unit as used in FIG. 1;

FIG. 3 is a basic electronic circuit for effecting operation of the pulse power balancer illustrated in FIG. 1;

Figure 5:
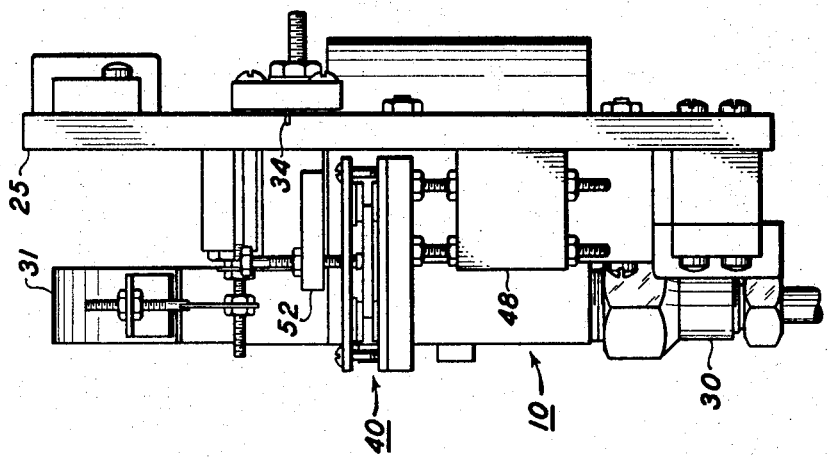
Figure 4:
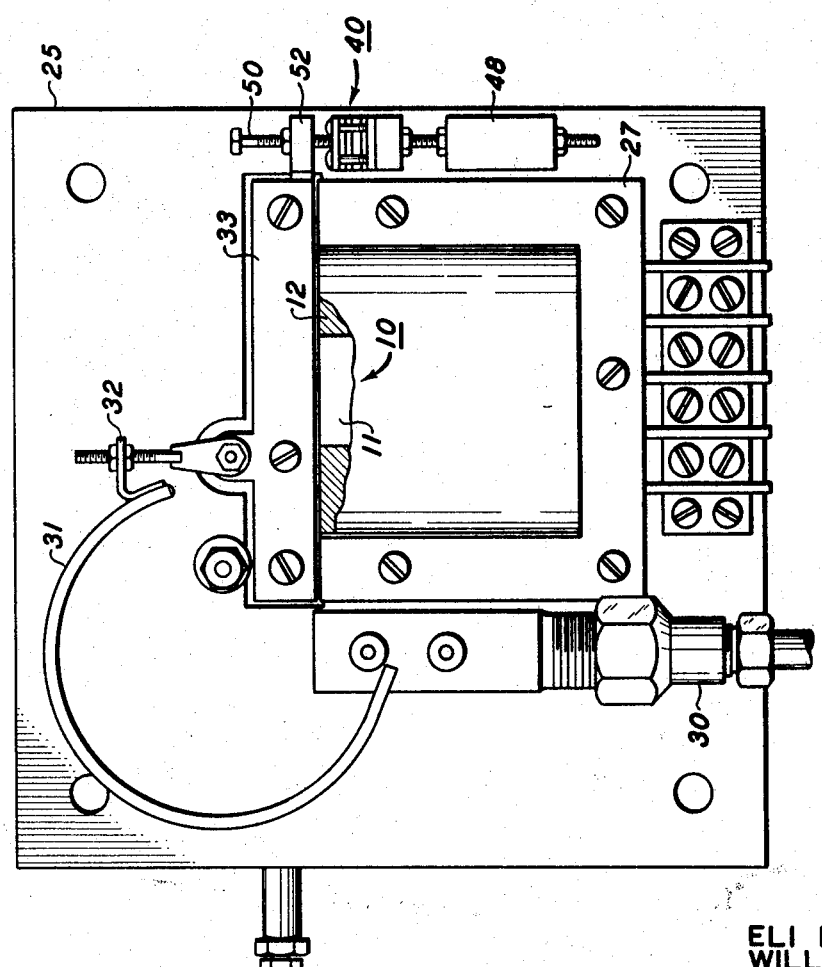
Figure 6:
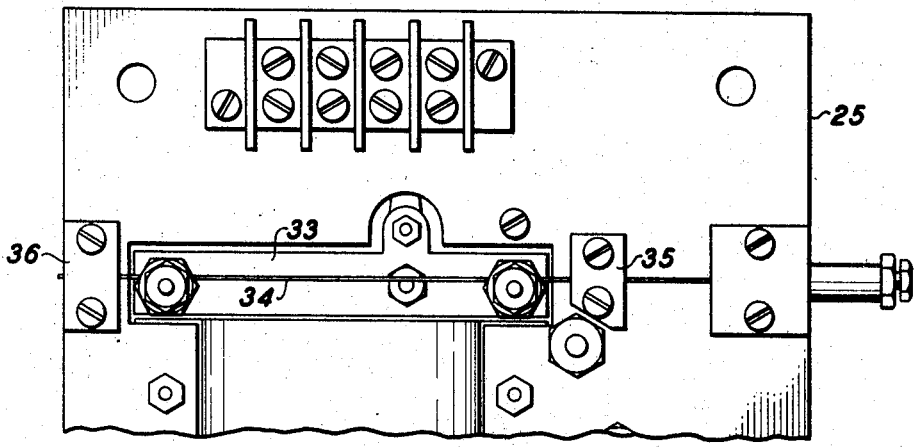
Figure 7:
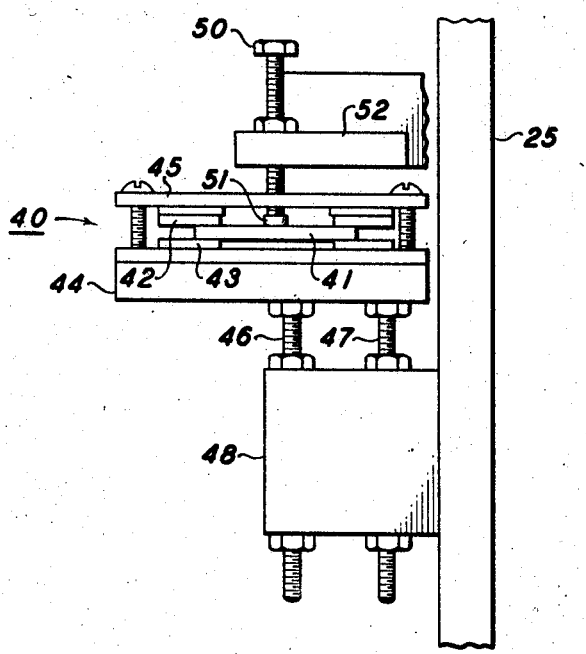
Figure 8:
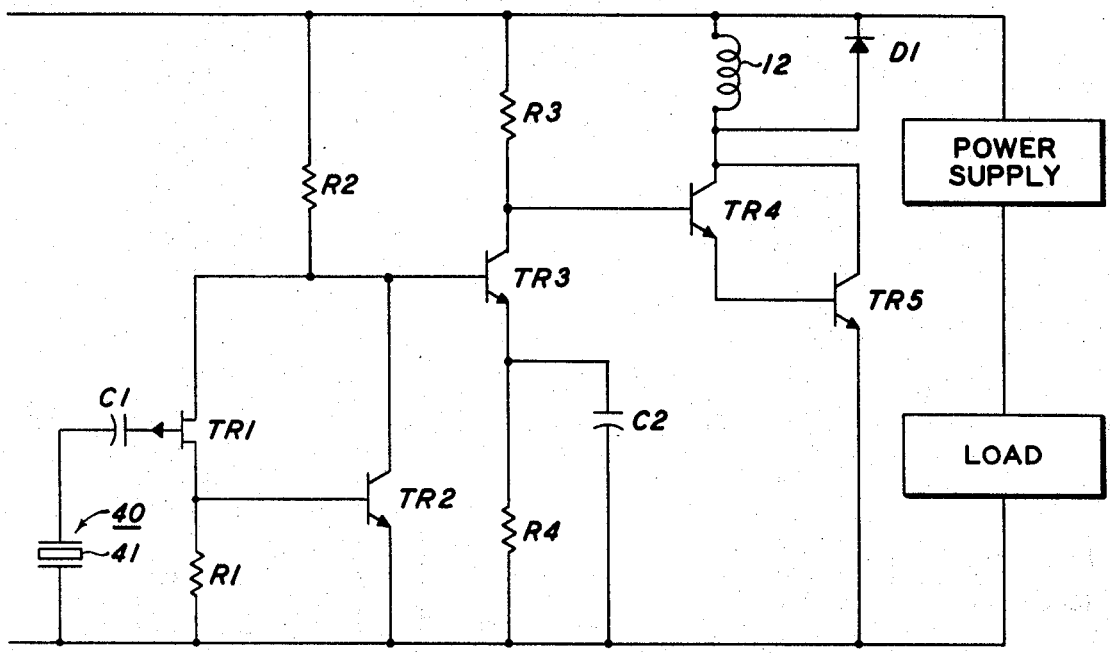
Figure 9:
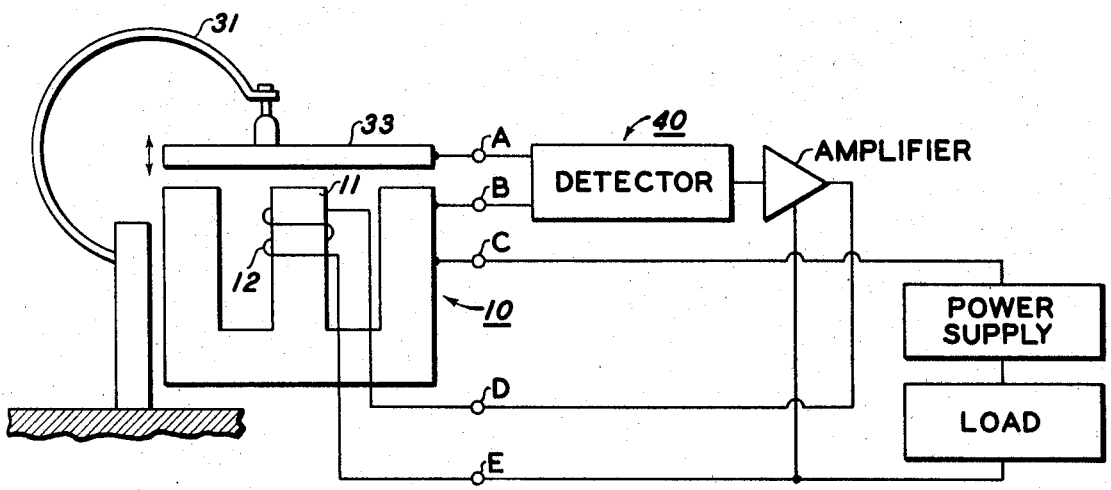
Figure 10:
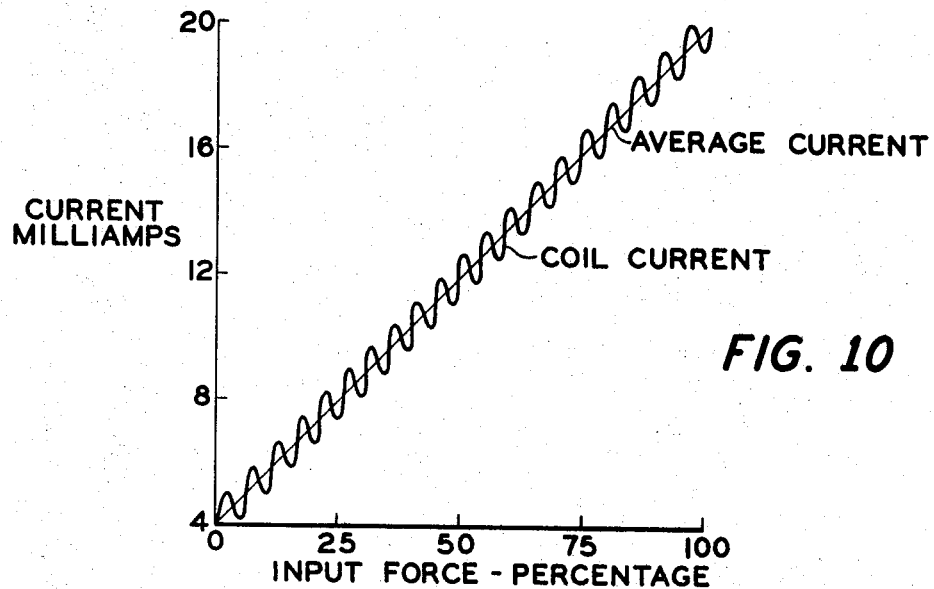

FIGS. 4, 5, and 6 are front, side and partially rear views respectively of a pressure transmitter utilizing force balance with a pulse power balancer having a second embodiment detector unit;

FIG. 7 is an enlarged view of the piezo-electric detector assembly for the pressure transmitter;

FIG. 8 is a schematic of the amplifying circuit for the pressure transmitter;

FIG. 9 is a schematic diagrammatic showing of the pressure transmitter;

FIG. 10 graphically illustrates the wave form of the coil current in the transmitter; and FIGS. 11–23 are schematic diagrammatic illustrations of different utility embodiments for which the invention hereof can be readily adapted.

Referring now to FIG. 1, there is illustrated a basic E-shaped electromagnet transformer 10 having a center core 11 of permeable magnetic material laminated to reduce magnetic eddy current loss and comprising a magnetic force stator and armature or the like. About the center core 11 is wound the exciting coil 12. Extending screwed centrally upward through the core is a threaded screw 13, the upper end of which forms an electrode contact 14.

Supported by a suitable suspension in physical relation to center core 11 is an armature 19 having a lower downward dependent magnetic electrode contact 20 aligned coaxially opposite, substantially co-extensive and closely spaced to electrode contact 14. These electrodes in combination are adapted for a maximum movement separation of generally less than 0.001″ and comprise a "resistance-change" type detector unit having low resistance when closed and high resistance when open. Other detector unit types can be employed instead including various forms known in the art such as piezoelectric ceramic, photoelectric sensors, variable reluctance sensors, variable resistance sensors, hall effect, magnetoresistive, etc. as will be understood. Connected to the armature is an input measurement force 21 which may comprise any suitable mechanical, pneumatic, electrical, hydraulic, or other known force from which it is sought to effect a proportional output and feedback signal in accordance with the usage with which it is to be put.

The contacts 20 and 14 are closely spaced in their normal relation as described above and this spacing is adjustable in accordance with the positioning of the screw thread 13 for which a screwdriver slot 22 is provided. By applying circuitry as in the manner shown in FIG. 3, which may or may not include electronic devices, the balancer is operative such that the force transmitted from 21 to the armature 19 (in the direction of the arrow) causes electrode separation. This energizes coil 12 and in an extremely short time duration approaching the instantaneous, the magnetic effect caused by the energized coil returns the electrodes into physical circuited contacting relation. As the two electrodes touch, a current shunted through them immediately de-energizes coil 12 causing the force from source 21 to effect a rapid almost immediate withdrawal of electrode 20. This operates in a highly rapid cyclic mode whereby with each opening and closing of the electrodes, there is produced an output signal current proportional to the input force that is utilized also as the feedback. Since the operation is highly rapid having a frequency on the order of approximately 100 cycles per second and above, the current output produces a dither effect introduced as part of the operation and by which accuracy is improved and hysteresis of mechanical parts is reduced. Magnetic hysteresis is also reduced making possible the use of magnetic core materials.

Electrical operation can be better understood by referring to FIG. 3. $R_5$ is of the proper resistance to saturate the Darlington pair comprised of $TR_6$ and $TR_7$. When contacts 20 and 14 are not shorted (open), full current flows thru coil 12. When the magnetic field generated by the pulse power balancer is sufficiently strong to attract the armature, on which is mounted contact 20, the latter comes into juxtaposition with contact 14 and brings the base lead of $TR_6$ to circuit common potential (−). This turns off $TR_6$ and $TR_7$ and stops input current to coil 12. Diode $D_2$ prevents the inductive voltage thus generated from damaging $TR_6$ and $TR_7$. The power supply and variable load represent the remote power supply and signal receiver respectively connected to the transmitter via the wires designated + and −. The operation described utilizes a normally open contact as referenced to the unit in the power-on-state. It should be appreciated that a detector and associated electronics can also be set up to operate on a normally closed contact basis as well.

Referring now to FIGS. 4 thru 10, there is illustrated a pressure transmitter utilizing the principles described above and with such modifications as will be described below. The unit consists of a mounting plate 25 on which is secured an E-shaped magnetic member 10 by means of enclosing brackets 27. An input force in the form of a fluid pressure is connected via conduit 30 and transmitted by means of a bourdon spring 31 through a zero adjustment member 32 to armature 33 acting against a suspension 34 pivoted about supports 35 and 36. Instead of a pressure source, input could likewise be any force which is proportional to the variable to be measured, e.g., auxiliary coil current v. a fixed or variable spring force either additive or subtractive from the output coil as will be understood.

For sensing deviation from the initial position by the force exerted by the bourdon spring 31, there is provided a detector unit 40, which in the embodiment being described is of the piezo electric type. The unit consists of a piezo electric crystal 41 secured about its rectangular periphery by means of suitable shim stock 42 and 43 secured to a mount 44 to which a top bracket 45 is screwed tight. Mount 44 is in turn supported via adjustable screws 46 and 47 permitting setting and adjusting of the crystal datum plane as will be understood, and in turn based in bracket 48.

Operation of the transmitter is effected by means of an adjustable screw 50 having a plastic tip 51 and supported through the forward end 52 of armature 33 in a manner whereby the tip in response to armature attraction by core 11 is adapted to engage and exert pressure on the ceramic crystal 41. As current passes through the exciting coil 12 about the central portion of magnetic member 11, armature 33 is attracted thereto and on pivoting about 34 is drawn towards the magnetic member extending screw 50 into pressure contact with the piezo electric crystal 41. The tip 51 of the actuator is adjusted to strike the piezo electric crystal while there still remains a small distance between the magnetic member and armature 33, such that the circuitry shown in FIGS. 8 and 9 to be described is effective to disconnect the current and de-energize the magnetic member. The system works just as well by turning the current on upon release of stress from the piezo electric crystal instead of upon application of stress to the crystal. By this means, the spring force exerted from the bourdon to draw armature 33 away from magnetic member 11 can unstress the ceramic and re-energize the coil, since the spring force of the bourdon is related to both its deflection and to the pressure input through the conduit 30. The average current through the coil is substantially, exactly and automatically regulated by the periodic on and off signal from the ceramic crystal being that the force is related to the average ampere turns on the coil. Since the number of turns is fixed at each coil or tap thereof the force is related only to the current, and vise versa. The small motion of the armature 33 linked to the bourdon creates a mechanical "dither" which tends to average out mechanical hysteresis. The modulating current pulsations which generate the balance force "dither" is illustrated in FIG. 10.

Magnetic hysteresis is also considerably reduced by the on-off operation of the coil current.

Referring to FIG. 8, it can be seen that the circuit is operative essentially as a high gain A.C. input amplifier. Output of the piezoelectric detector 40 is applied between circuit common (minus) and $C_1$ which is a coupling capacitor. The alternating signal passes thru the capacitor into $TR_1$ which is a high input impedance field effect transistor. The high input impedance allows minimum loading of crystal 41. $TR_2$ in conjunction with $TR_1$ or a stabilizing and power stage for the input and gain to $TR_1+TR_2$ is unity. $TR_3$ provides voltage gain for the signal while $R_3$ is the load resistor and $R_4+C_2$ provide the proper operating bias for $TR_3$. $TR_4$ and $TR_5$ form a Darlington pair for current gain, and modulate the current through coil 12 to just counterbalance applied force. Diode $D_1$, prevents inductive voltages developed in coil 12 from damaging output transistors $TR_4$ and $TR_5$. The power supply and variable lead represent the remote power supply and signal receiver respectively connected to the transmitter via the 2 wires designated + and −.

In FIG. 9 there is schematically illustrated a condensed circuit for the pressure transmitter just described and embodying the amplification components described in connection with FIG. 8. To the extent that this circuit is used in the same or modified form for other transmitter embodiments described in connection with additional drawing figures hereof, there is illustratively designated common terminal junction A, B, C, D, E, etc.

As shown in FIG. 9, this embodiment with a bourdon, capsule, or bellows can likewise be utilized as a pneumatic transducer as for example converting a pneumatic input signal to proportional electronic current or voltage signal. Transducers to effect this result are commonly employed in industry to convert an existing pneumatic control signal of approximately 3–15 p.s.i. to an electronic signal which can then be transmitted over long distances, sent to a computer, or the like.

Sensitivity of the system is to some degree dependent upon its operative ranges. For example certain devices such as pressure transmitters, temperature transmitters, etc. have suppressed ranges such that a pressure transmitter with an output range of 4–20 milliamps corresponding to 0–1000 p.s.i. input would have a 0.8 milliamp output for each 50 p.s.i. of input. However, where the measurement sought to be detected were in a pressure range of for example 900–1000 p.s.i., then it becomes desirable to suppress out the first 900 p.s.i. so that the complete instrument range of 4–20 milliamps corresponds to the 900–1000 p.s.i. input. By this means, the 100 pound range produces a system where each 0.8 milliamp is equal to 5 p.s.i. Suppression is easily accomplished with the device of the invention by a spring force exerted by the bourdon spring 31 or an additional adjustable spring assembly pushing or pulling down armature 33 such that the force to be balanced by the generated coil current force is reduced. This is adjustable through the zero adjustment mechanism 32 or by other suitable adjustment means.

The output of the transmitters thus far described has represented a current signal. This current is an average current determined by the pulsation time or frequency. By calibrating the output signal on a frequency rather than a current basis with a proportional frequency output, this system is transposed into a frequency transmitter. This offers the advantage of a frequency output in which accuracy is not degraded in transmission over long distances. The system is utilized, for example, wherein when extreme ranges of input correspond to given frequencies, it becomes possible to produce an output at an intermediate frequency being proportional to the analog input.

This unit can likewise be operated without the bourdon as an electronic micrometer in that the armature gap movement or change in magnetic attraction determines the output current such that the motion movement becomes an output signal device. More specifically, the gap represented between the armature and the center core 11 for a given reference dimension puts out a corresponding signal. By closing the gap against a member to be measured the change of gap from the reference and corresponding to the dimension of the article being measured will emit an output signal indicating the dimension thereof. This can likewise constitute a thickness gauge as for example, with a moving web of material passing between spring loaded rollers therebetween such that any movement reflecting a change of spacing between the baffle and the core will deflect a spring, changing the applied force and emitting an output signal reflecting the dimensional difference.

Figure 11:
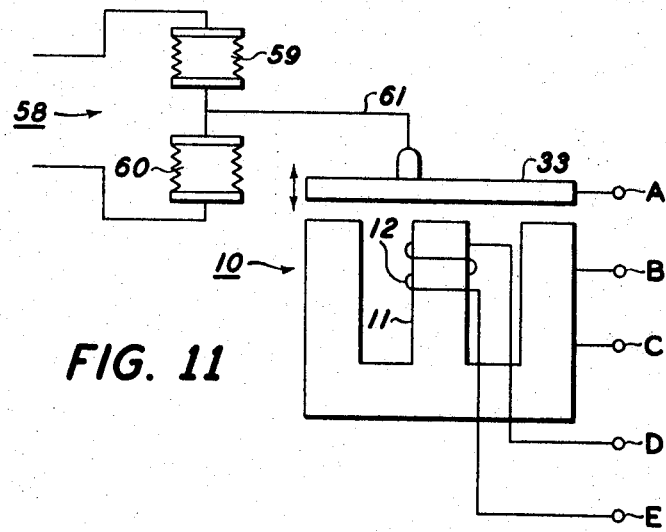

Referring now to FIG. 11, there is shown an adaptation of the invention hereof as a flow transmitter. Specifically, for these purposes, the armature 33 is connected to a differential pressure primary device 58 which senses the upstream and downstream pressures of an orifice nozzle, venturi or other flow device. Through opposite bellows members 59 and 60 the device emits a signal through member 61 proportional to the differential pressure. This is transmitted to the armature to produce movement thereof in a manner whereby detector unit 40 will operate as before for emitting an output signal. The output signal can then be used with or without amplification or modification with other electrical or electronic devices such as recorders, controllers, analog to digital converters, feedback function shaping circuits, etc.

Figure 12:
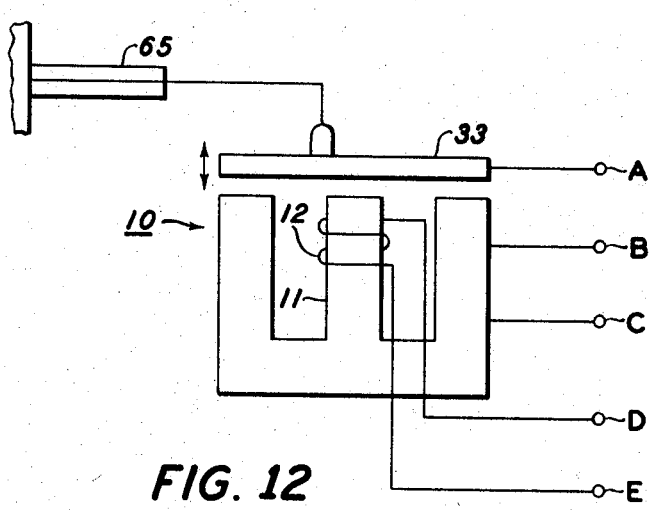

In FIG. 12, there is illustrated a temperature transmitter in which a temperature sensitive device 65, such as a mercury spring thermal tube sytem or bimetallic element is atached to the armature 33 in order to effect movement thereof as above. This particular embodiment has wide utility in the industral control field where, for example, to control process temperature by utilizing the output signal connected to a controller, power amplifier, or the like.

Figure 13:
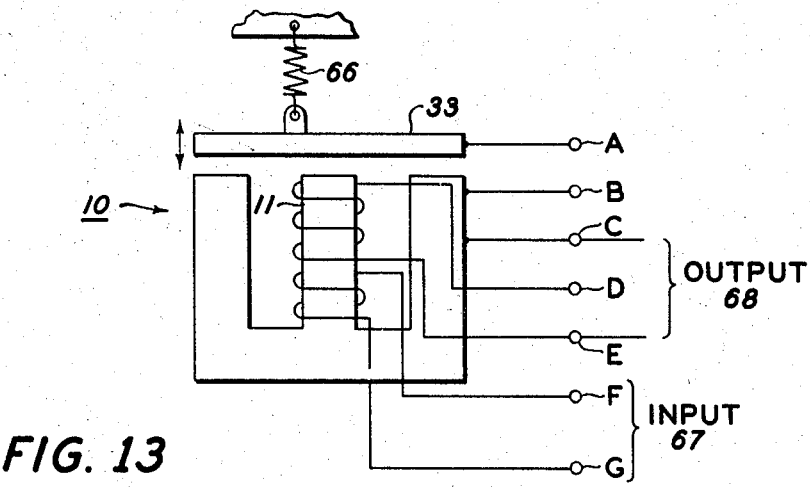

In FIG. 13, there is illustrated an adaptation embodiment for use as a direct D.C. amplifier isolation system or in order to effect isolation as is frequently required in electrontric circuitry and control system for preventing interaction of signals, ground loops, and loading effects. In the direct type isolator shown in FIG. 13, a reference force is exerted onto armature plate 33 by means of a spring element 66. In place of coil 12 the core 11 is wound with two separate input and output coils designated 67 and 68 respectively, each having equal ampere turns. They are opposingly operative in a manner whereby the input current from a D.C. measurement transmitter controller or the like, connected through terminals F and G to coil 67 electromagnetically attracts armature 33 through a fixed degree of movement. This is effective to actuate detector unit 40 whereby to energize output signal coil 68 which then repels the armature to maintain a forced balance condition. By this means, the output signal reproduces the input signal within the accuracy of the instrument and at the same time effects a signal isolation. Each of the input and output wires are likewise capable of producing the necessary isolation to effect a reversing isolator. A high spring force is adjusted to exert a continuous pressure on the armature so that 0 milliamps or a low input milliamp signal, of polarity such that the magnetic field aids the field generated by the output current, puts out a high output signal, e.g., 20 milliamps. That is, since the input current is connected to attract the armature requiring a lower output current to repel it, there is created a reversing isolator by the normal action of the device.

Figure 14:
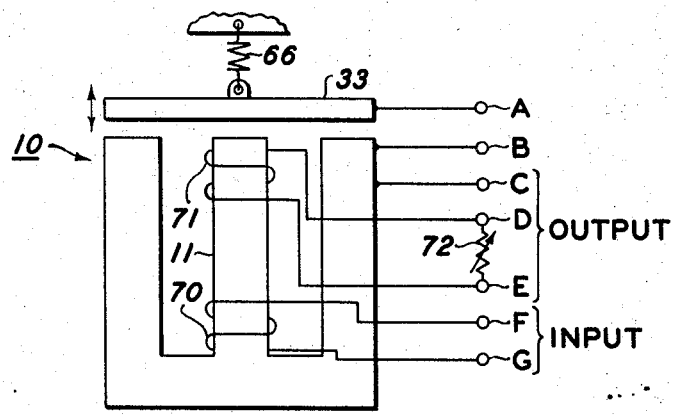

In FIG. 14, there is illustrated adapting the device hereof as a converter in which an input signal or voltage signal is put into a first winding 70 of a double winding coil which includes the second winding 71. Where there is a ratio of windings between coils, e.g. 5:1, then the output current can be ⅕ or five times the input current following the operation as described above. This finds utility, for example, in adapting this device to units marketed by other manufacturers. For example, different manufacturers of electronic control equipment have different transmission signals, some utilizing 10 to 50 milliamps and others 4 to 20 milliamps. To adapt or combine these units in forming a complete system it is necessary to convert these signals to allow use at the appropriate signal level.

To operate this same device as a "ratio" unit in accordance with FIG. 14 as, for example, to maintain a ratio in a process system suppling ingredients in their proper proportions, a proper ratio is maintained between the input and output coils such that the output is then a ratio of the two coils. Taps on the output coil allow the ratio to be externally set by instruments and an adjustable shunt 72 on the input or output coil permits vernier ratio adjustment. The output signal can be used with or without amplification or modification with other electrical, electro-mechanical, or electronic devices such as recorders, controllers, integrators and counters, analog to digital converters, etc.

Figure 15:
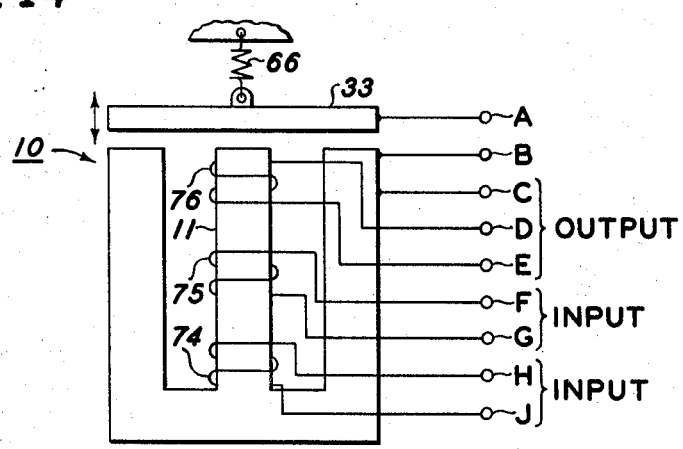

In FIG. 15, the system hereof is adapted as an adder useful to accept two or more linear input signals such as two or more flows in parallel lines or into a junction and produce an output signal equal to the sum of the inputs. This is operative by utilizing two or more equal input coils 74, 75 and an output coil 76. The output coil 76 has a number of turns equal to each of the equal input coils to emit an output equal to the summation of the input coils. The output signal can be used with or without amplification or modification with other electrical, electro-mechanical, or electronic devices such as recorders, controllers, integrators and counters, analog to digital converters, etc.

Figure 16:
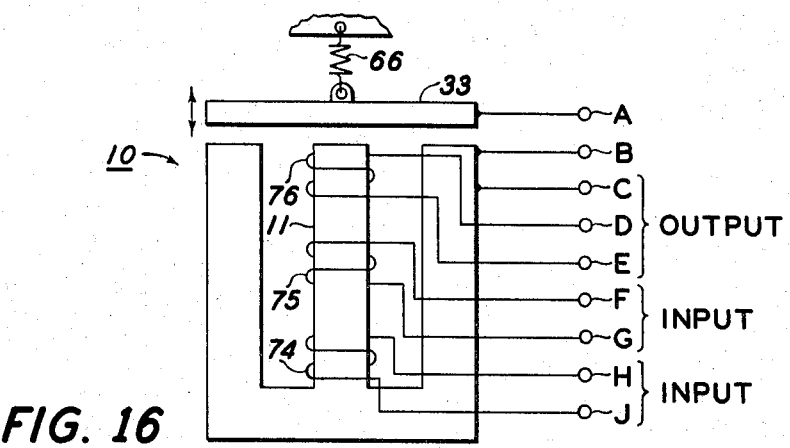

In FIG. 16 the apparatus is modified from FIG. 15 as a "subtactor" in which the second coil 75 is connected in opposite polarity from coil 74 and the output coil 76 is equal to the difference between the latter coils. This unit can be used to accept two or more linear input signals one of which represents a total flow in a single line which feeds into a multiple outlet junction and produces an output signal equal to the difference between the total flow and one or more of the junction outlet flows. The output signal can be utilized with or without amplification or modification with other electrical, electro-mechanical or electronic devices such as recorders, controllers, integrators and counters, analog to digital converters, etc.

Figure 17:
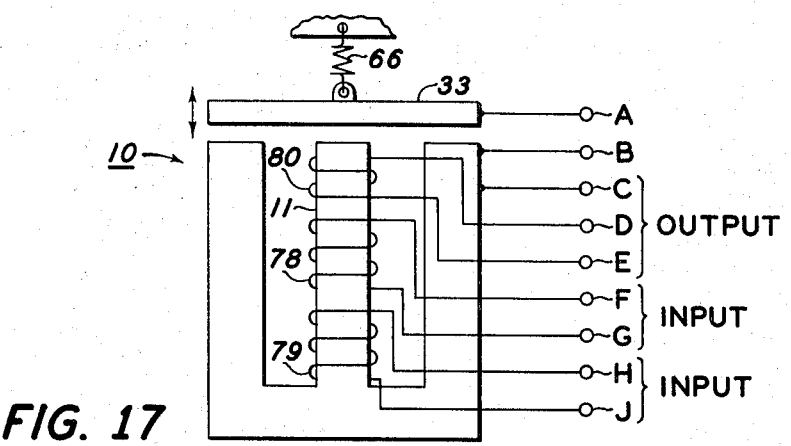

FIGS. 17, 18, 19 and 20 illustrate variations for operating the device as a computing relay. Relays of this type are used in process control systems to provide answers to many control formulas such as heat measurement in relation to quantity flowing as a function of a temperature difference. To effect an averaging result as shown in FIG. 17, input coils 78 and 79 are similarly connected as in FIG. 14 excepting that the output coil of this embodiment is equal in turns to one half the input coils. In this manner the output is always the sum of the inputs divided by two.

Figure 18:
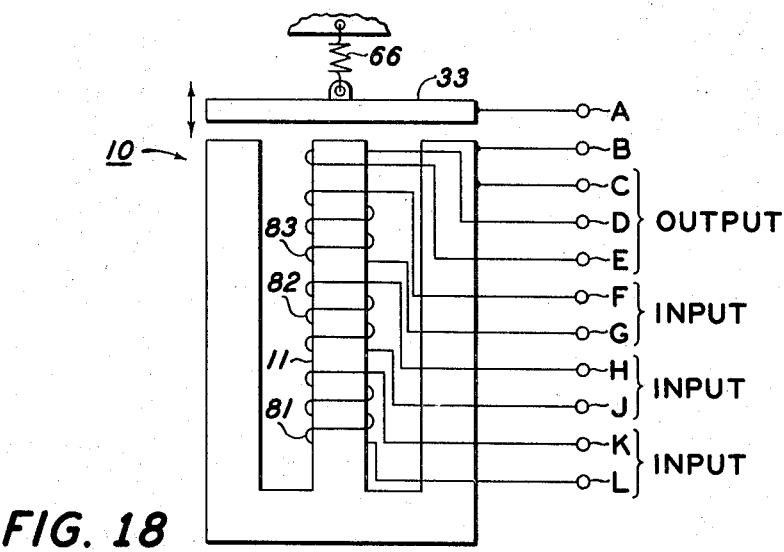

To effect multiple averaging output, the coils are wound in the manner shown in FIG. 18. In this system, an X number, shown as 3 or more, of equal input coils 81, 82 and 83 are combined with an output coil equal to 1/X turns. The manipulation of the number of coils and the ratio of the number of turns of each allows this unit to be utilized on multiple ratioing applications.

Figure 19:
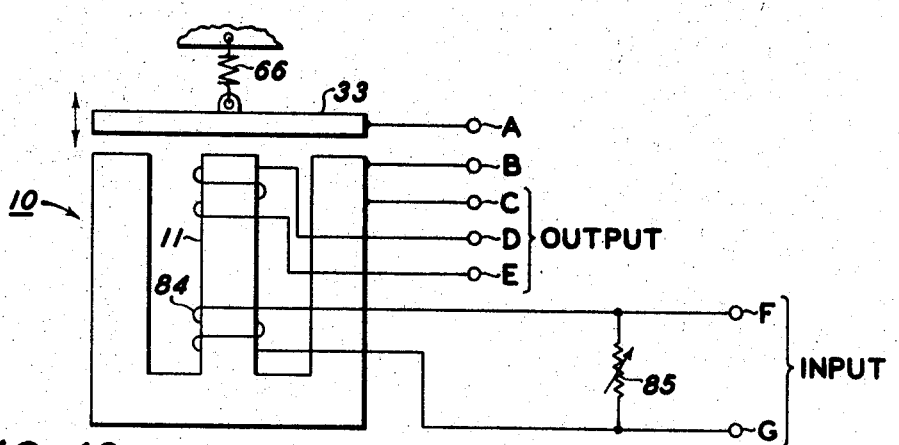

In FIG. 19, the unit is adapted for muliitiplication effects wherein an input signal is shunted via an adjustable resistance change input variable past the input to the coil 84 by an adjustable shunt 85. The output signal produced thereby is a product of the input and shunt which represent a percentage of the whole signal transmitted.

Figure 20:
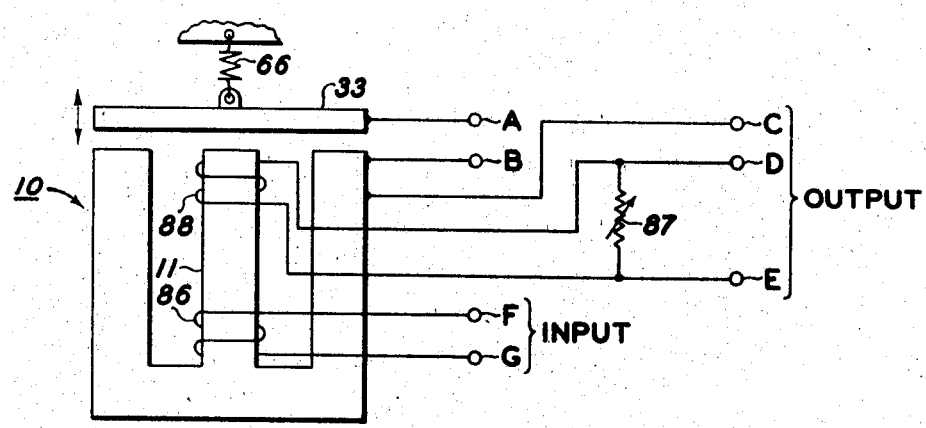

In FIG. 20, a division computing relay is produced wherein the input signal is to coil 86 and 87 is an adjustable resistance change input variable shunt around the output coil 88, such that the output is the ratio of input/shunt.

Figure 21:
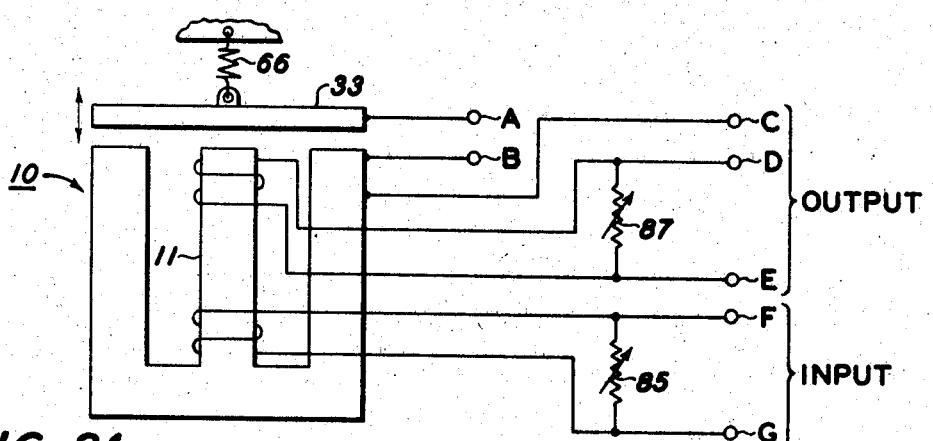

In FIG. 21, the system is adapted for quantity measurement of mass flow of liquids or the like. Since mass flow follows the equation $$Q = k\sqrt{\frac{hP}{T}}$$

a combination multiplier and dividing unit with subsequent square root extraction, produces a mass flow computer. In essence this system is a combination of the system described in connection with FIGS. 19 and 20.

Figure 22:
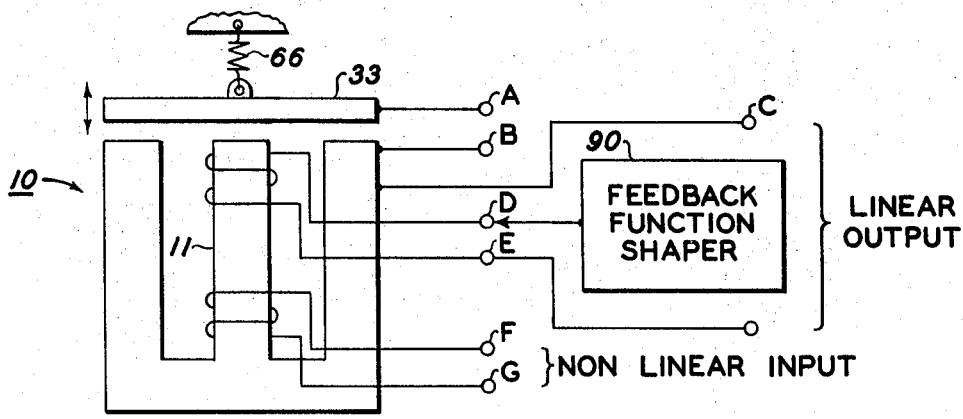

In FIG. 22, the system employs a non-linear function shaper 90 in the feedback to the power balancer to afford an accurate shaped output signal. Square root feedback shaping is required in order to provide a linear output from a differential pressure input signal.

Figure 23:
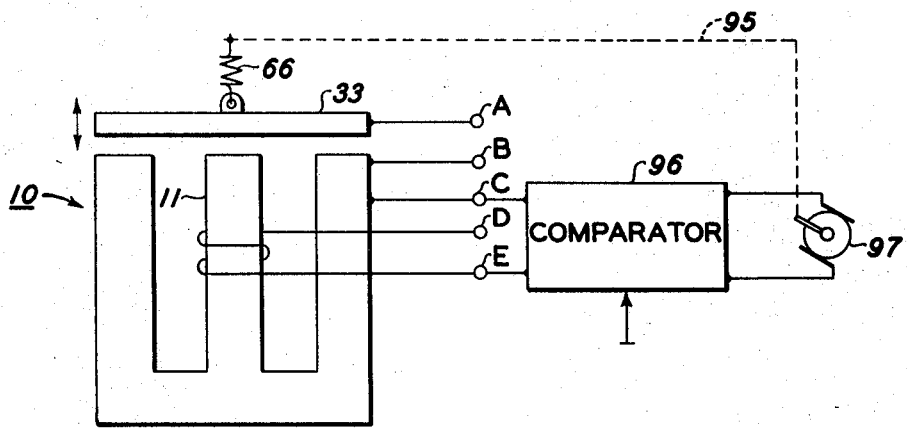

In FIG. 23, the balancing unit is operated as a null detector in a servo-recorder wherein a pen (not shown) position controls a cable 95 which operates the armature 33 as feedback. The input and output signals are compared by means of comparator 96 and the error then drives a servo motor 97 operatively connected to a cable (not shown) whereby the pen is repositioned. With this embodiment, the balancing unit can operate as the feedback in any servo system.

By the above description, there is disclosed a novel pulse power force balance instrument transmitter on which the circuit operates as a feedback loop with the power to force balance an input signal and at the same time producing an output signal proportional to the input. The system is highly versatile and flexible and adapted to a wide range of utility as evidenced by the specific embodiments described. It is not intended that the invention hereof be limited to the described embodiments, since many further variations will likely occur to those skilled in the art. Further, since many changes could be made in the above construction and many apparently widely different embodiments of this invention culd be made without departing from the scope thereof, it is intended that all matter contained in the drawings and specification shall be interpreted as illustrative and not in a limiting sense.

We claim:

1. A force balance instrument signal transmitter comprising, in combination: a normally unenergized electromagnetic means, a movable armature connected to receive an input measurement force and alternately movable oppositely in response to a force balance relation between said input force and the force of said electromagnetic means when energized; and a detector means responsive to the movement of said armature for energizing of said electromagnetic means and for transmitting an electrical output signal correlated to said input measurement force, said detector means comprising, normally closed switch means, said switch means opening responsive to said input measurement force and means responsive to the opening of said switch means for energizing said electromagnetic means, thereby to close said switch means.

2. Apparatus according to claim 1 in which said output signal comprises a frequency representation of said input force.

3. A force balance instrument signal taransmitter comprising in combination: normally unenergized electromagnetic means including a magnetic core having wound therabout an exciting coil; an armature receiving an input measurement force and supported suspended juxtaposed to the core of said electromagnetic means for movement oppositely in response to a force balance relation between said input force and the force of said electromagnetic means when said exciting coil is energized; and, a detector comprising normally closed switch means, said switch means having a pair of electrodes, one of said electrodes being movable relative to the other electrode in response to movement of said armature to open said switch, means responsive to the opening of said switch to energize said coil to close said switch and means responsive to energization of said coil for measuring said force.

4. Apparatus according to claim 3 in which said detector unit is operatiev to de-energize said exciting coil as said armature approaches a predefined spacing from said core.

5. Apparatus according to claim 4 in which said detector unit is pulsingly operative at a cyclic frequency producing a dither effect in the output signal.

6. Apparatus according to claim 4 in which said detector unit comprises a piezoelectric crystal operative by the exertion of pressure thereon generated by movement of said armature.

7. Apparatus according to claim 4 in which said input measurement force comprises the force output of a temperature sensitive element and there is included means to communicate said force to said armature.

8. Apparatus according to claim 4 in which said input measurement force comprises the force output of a fluid flow unit senser and there is included means to communicate said force to said armature.

9. Apparatus according to claim 4 in which said detector unit comprises a pair of oppositely aligned electrodes movable relatively apart generally less than about 0.001 inch and having a relatively higher electrical resistance when open as compared to when closed.

10. Apparatus according to claim 4 in which the input force to said armature is the feedback from a servo-recorder system and there is included means to communicate said force to said armature and comparator means comparing the input and output signals to control the operation of said servo system.

11. A force balance instrument signal transmitter comprising in combination: an electromagnetic transformer having a magnetic central core with an exciting coil wound thereabout; an armature receiving an input measurement force and supported on balanced flexure means juxtaposed to the central core of said electromagnetic transformer for movement oppositely in response to a force balance relation between said input force and the force of said electromagnet transformer when said exciting coil is energized; and, said detector means comprising, normally closed switch means, said switch means opening responsive to said input measurement force and means responsive to the opening of said switch means for energizing said electromagnetic means, thereby to close said switch means.

References Cited
UNITED STATES PATENTS 2,511,752  6/1950  Tandler et al. _____ 340—187 X DONALD J. YUSKO, Primary Examiner C. MARMELSTEIN, Assistant Examiner U.S. Cl. X.R.

340—200, 203; 336—30